Patented July 15, 1924.

1,501,769

UNITED STATES PATENT OFFICE.

LOUIS HAAS, OF PARIS, FRANCE, ASSIGNOR TO SOCIÉTÉ CHIMIQUE DE LA GRANDE PAROISSE, OF PARIS, FRANCE.

GREEN DYE-STUFFS DYEING IN REDUCING BATHS AND THEIR PROCESS OF MANUFACTURE.

No Drawing.   Application filed May 10, 1923. Serial No. 638,104.

*To all whom it may concern:*

Be it known that I, LOUIS HAAS, of 13 Rue des Saussaies, Paris, France, have invented Green Dye-Stuffs Dyeing in Reducing Baths and Their Processes of Manufacture, of which the following is a full, clear, and exact description.

This invention has for its object a process of manufacture of green dye-stuffs dyeing in reducing baths.

It is known to treat nitroaminophenol $1:3:4$ $C_6H_3NO_2:NH_2:OH$ with alkaline polysulphide, for obtaining black dye-stuffs which differ from each other only by their more or less red, blue or green reflections.

The process forming the subject-matter is essentially characterized by the fact that nitroaminophenol $1:3:4$ is diazotised before being subjected to the action of an alkaline polysulphide. By means of this process it is possible to obtain, not black dye-stuffs, but green dye-stuffs with blue reflections, of very fine shade.

By way of example the present process can be carried out by the following modus operandi:

The nitroaminophenol $1:3:4$ is diazoted and 1.5 kilos of the product is put in a wet state, in a melted mixture of 3 kgs. of crystallized sulphide of sodium and of 1.5 kg. of sulphur, in small quantities then, when the gaseous evolution is finished, the mixture is gradually heated up to about 200° C. When the evolution of hydrogen sulphide has ceased the mass is dissolved in boiling water to which is added 1 to 2 kgs. of crystallized sulphide of sodium. The dyestuff which has been formed can be precipitated by an acid or separated in any other manner.

This dye-stuff has the property of dyeing vegetal fibre, in reducing baths of sulphide or hydrosulphide of sodium, in bluish green shades. These shades resist washing and over-dyeing; they further heighten in colour upon chromium treatment or in a bath of perborate, by slightly blueing.

The proportions above indicated are given by way of indication and can be modified.

Claims:

1. A process for the manufacture of green dye-stuffs with blue reflections which consists, substantially, in diazotising nitroaminophenol $1:3:4$, then in subjecting the product obtained to the action of an alkaline polysulphide.

2. A process as claimed in claim 1, which consists in introducing the diazo of nitroaminophenol $1:3:4$ in polysulphide of sodium in fusion, then in raising the temperature to about 200° C. until the evolution of hydrogen sulphide has ceased.

The foregoing specification of my green dye-stuffs dyeing in reducing baths and their process of manufacture, signed by me this 27th day of April, 1923.

LOUIS HAAS.